United States Patent
Remein et al.

(10) Patent No.: US 10,382,136 B2
(45) Date of Patent: Aug. 13, 2019

(54) ENVELOPE HEADER DESIGN IN PASSIVE OPTICAL NETWORKS

(71) Applicant: Futurewei Technologies, Inc., Plano, TX (US)

(72) Inventors: Duane Richard Remein, Raleigh, NC (US); Bo Gao, Wuhan (CN); Yuanqiu Luo, Cranbury, NJ (US); Dianbo Zhao, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/914,872

(22) Filed: Mar. 7, 2018

(65) Prior Publication Data

US 2018/0316435 A1 Nov. 1, 2018

Related U.S. Application Data (60) Provisional application No. 62/490,483, filed on Apr. 26, 2017.

(51) Int. Cl.
*H04B 10/27* (2013.01)
*H04L 29/06* (2006.01)
(Continued)

(52) U.S. Cl.
CPC ............ *H04B 10/27* (2013.01); *H04L 45/74* (2013.01); *H04L 69/22* (2013.01); *H04Q 11/0067* (2013.01)

(58) Field of Classification Search
CPC .......... H04B 10/27; H04L 45/74; H04L 69/22
(Continued)

(56) References Cited

U.S. PATENT DOCUMENTS

2004/0109450 A1* 6/2004 Kang ................. H04L 47/2433
370/390
2004/0184474 A1 9/2004 Kim et al.
(Continued)

FOREIGN PATENT DOCUMENTS

CN 1533094 A 9/2004
CN 104243092 A 12/2014

OTHER PUBLICATIONS p802_3ca_PAR_Detail (Year: 2018).*
(Continued)

*Primary Examiner* — Oommen Jacob
(74) *Attorney, Agent, or Firm* — Schwegman Lundberg & Woessner, P.A.

(57) ABSTRACT

A computer-implemented method of handling Ethernet packets in a passive optical network (PON) is disclosed. The method comprises generating, by the one or more processors, an initial envelope header that indicates that the initial envelope header is not a preamble replacement; transmitting, over the PON, by the one or more processors, the initial envelope header; accessing, by the one or more processors, an eight-byte block from a first Ethernet packet of a plurality of Ethernet packets; in response to the eight-byte block being an Ethernet preamble, generating, by the one or more processors, a first envelope header that indicates that the envelope header is a preamble replacement; and transmitting, over the PON, by the one or more processors, the first envelope header.

20 Claims, 8 Drawing Sheets

(51) Int. Cl.
*H04Q 11/00* (2006.01)
*H04L 12/741* (2013.01)

(58) Field of Classification Search
USPC .................................................. 398/58, 66
See application file for complete search history.

(56) References Cited

U.S. PATENT DOCUMENTS

| | | | |
|---|---|---|---|
| 2015/0304046 A1* | 10/2015 | Kramer | H04Q 11/0067 398/66 |
| 2016/0156519 A1* | 6/2016 | Ramsey | H04W 12/06 370/254 |
| 2017/0026128 A1* | 1/2017 | Remein | H04L 69/08 |
| 2017/0070295 A1 | 3/2017 | Remein et al. | |

OTHER PUBLICATIONS

IEEE 802.3 2005, pp. 69, 292-295 (Year: 2005).*
"International Application No. PCT/CN2018/084370, International Search Report and Written Opinion dated Aug. 8, 2018", (Aug. 8, 2018), 10 pgs.
Remein, Duane, et al., "GLID as Envelope ID", IEEE 802.3ca 100G-EPON Task Force, Vancouver, BC, Mar. 13-16, 2017, (Mar. 13, 2017), 28 pgs.
Remein, Duane, et al., "MPRS with preamble replacement: Toward a more proficient 100G-EPON", IEEE 802.3ca 50G-EPON Task Force, Jan. 10-12, 2017, Huntington Beach, CA, (Feb. 6, 2017), 22 pgs.

* cited by examiner

ENVELOPE HEADER DESIGN IN PASSIVE OPTICAL NETWORKS

PRIORITY CLAIM

This application claims the benefit of priority to U.S. Provisional Patent Application Ser. No. 62/490,483, filed Apr. 26, 2017, and entitled "Envelope Header Design in 100 GB/S PON," which provisional application is incorporated herein by reference in its entirety.

TECHNICAL FIELD

The present disclosure is related to 100 gigabit-per-second (GB/s) passive optical networks (PONs) and, in particular, to an envelope header design in PONs.

BACKGROUND

Ethernet passive optical networks (EPON) are optical networks that handle Ethernet packets. The IEEE P802.3ca 100G-EPON Task Force was established in 2015. The main objective of this task force is defining the physical layer specifications and management parameters for 25 Gb/s, 50 Gb/s, and 100 Gb/s PONs. Such 50 Gb/s and 100 Gb/s optical network units (ONUs) in the 802.3ca system will contain multiple transceivers. Their traffic is transmitted via multiple wavelength channels in parallel, with each channel working at 25 Gb/s. This type of wavelength channel bonding is a key feature of the 802.3ca system.

The original media-independent interface (MII) transmitted data at 100 Mbit/s. Extensions to MII, including but not limited to reduced MII (RMII), gigabit MII (GMII), and reduced gigabit MII (RGMII), are collectively referred to as xMII.

SUMMARY

Various examples are now described to introduce a selection of concepts in a simplified form that are further described below in the detailed description. The Summary is not intended to identify key or essential features of the claimed subject matter, nor is it intended to limit the scope of the claimed subject matter.

According to one aspect of the present disclosure, there is provided a computer-implemented method of handling Ethernet packets in a passive optical network (PON) that comprises: generating, by the one or more processors, an initial envelope header that indicates that the initial envelope header is not a preamble replacement; transmitting, over the PON, by the one or more processors, the initial envelope header; accessing, by the one or more processors, an eight-byte block from a first Ethernet packet of a plurality of Ethernet packets; in response to the eight-byte block being an Ethernet preamble, generating, by the one or more processors, a first envelope header that indicates that the envelope header is a preamble replacement; and transmitting, over the PON, by the one or more processors, the first envelope header.

Optionally, in any of the preceding embodiments, the method further comprises: generating, by the one or more processors, a modified second Ethernet packet from a second Ethernet packet of the plurality of Ethernet packets by: replacing a preamble of the second Ethernet packet with a second envelope header that includes an indication that the second envelope header is a preamble replacement; and transmitting, over the PON, the modified second Ethernet packet.

Optionally, in any of the preceding embodiments, the generating of the modified second Ethernet packet comprises: setting, in the second envelope header, a flag that indicates that the modified second Ethernet packet is encrypted; and encrypting the modified second Ethernet packet.

Optionally, in any of the preceding embodiments, the generating of the modified second Ethernet packet comprises: setting, in the second envelope header, a flag that corresponds to an encryption method; and the encrypting of the modified second Ethernet packet comprises encrypting the modified second Ethernet packet using the encryption method.

Optionally, in any of the preceding embodiments, the transmitting of the initial envelope header, the first envelope header, and the modified second Ethernet packet are part of transmitting an envelope; and the transmitting of the envelope comprises transmitting an Ethernet fragment after the modified second Ethernet packet.

Optionally, in any of the preceding embodiments, the initial envelope header comprises: a 1-bit encryption flag; a 1-bit key flag; an 8-bit cyclic redundancy check (CRC) field; and a 6-bit envelope position alignment marker (EPAM) field.

Optionally, in any of the preceding embodiments, the EPAM field of the initial envelope header has a value; and the method further comprises: generating, by the one or more processors, a second initial envelope header that indicates that the second initial envelope header is not a preamble replacement, wherein the second initial envelope header comprises a 6-bit EPAM field containing a value that is the same as the value of the EPAM field of the initial envelope header; transmitting, over the PON, by the one or more processors, the second initial envelope header; generating, by the one or more processors, a modified second Ethernet packet from a second Ethernet packet of the plurality of Ethernet packets by: copying the second Ethernet packet to the second Ethernet frame; and replacing a preamble of the second Ethernet packet with a second envelope header that includes an indication that the second envelope header is a preamble replacement; and transmitting over the PON, by the one or more processors, the second modified Ethernet packet.

Optionally, in any of the preceding embodiments, the transmitting of the initial envelope header over the PON uses a first wavelength; and the transmitting of the second initial envelope header over the PON uses a second wavelength.

Optionally, in any of the preceding embodiments, the transmitting of the initial envelope header and the first envelope header are part of transmitting an envelope; and the transmitting of the envelope comprises transmitting an Ethernet fragment.

Optionally, in any of the preceding embodiments, the Ethernet fragment is after the initial envelope header and before the first envelope header.

According to one aspect of the present disclosure, there is provided a system for transmitting Ethernet packets over a passive optical network (PON) that comprises: a memory storage comprising instructions; one or more processors in communication with the memory storage, wherein the one or more processors execute the instructions to perform: generating an initial envelope header that indicates that the initial envelope header is not a preamble replacement;

transmitting, over the PON, the initial envelope header; accessing an eight-byte block from a first Ethernet packet of a plurality of Ethernet packets; in response to the eight-byte block being an Ethernet preamble, generating a first envelope header that indicates that the envelope header is a preamble replacement; and transmitting, over the PON, the first envelope header.

Optionally, in any of the preceding embodiments, the one or more processors further perform: generating a modified second Ethernet packet from a second Ethernet packet of the plurality of Ethernet packets by: replacing a preamble of the second Ethernet packet with a second envelope header that includes an indication that the second envelope header is a preamble replacement; and transmitting, over the PON, the modified second Ethernet packet.

Optionally, in any of the preceding embodiments, the generating of the modified second Ethernet packet comprises: setting, in the second envelope header, a flag that indicates that the modified second Ethernet packet is encrypted; and encrypting the modified second Ethernet packet.

Optionally, in any of the preceding embodiments, the generating of the modified second Ethernet packet comprises: setting, in the second envelope header, a flag that corresponds to an encryption method; and the encrypting of the modified second Ethernet packet comprises encrypting the modified second Ethernet packet using the encryption method.

Optionally, in any of the preceding embodiments, the transmitting of the initial envelope header, the first envelope header, and the modified second Ethernet packet are part of transmitting an envelope; and the transmitting of the envelope comprises transmitting an Ethernet fragment after the modified second Ethernet packet.

Optionally, in any of the preceding embodiments, the initial envelope header comprises: a 1-bit encryption flag; a 1-bit key flag; an 8-bit cyclic redundancy check (CRC) field; and a 6-bit envelope position alignment marker (EPAM) field.

Optionally, in any of the preceding embodiments, the EPAM field of the initial envelope header has a value; and the one or more processors further perform: generating a second initial envelope header that indicates that the second initial envelope header is not a preamble replacement, wherein the second initial envelope header comprises a 6-bit EPAM field containing a value that is the same as the value of the EPAM field of the initial envelope header; transmitting, over the PON, the second initial envelope header; generating a modified second Ethernet packet from a second Ethernet packet of the plurality of Ethernet packets by: copying the second Ethernet packet to the second Ethernet frame; and replacing a preamble of the second Ethernet packet with a second envelope header that includes an indication that the second envelope header is a preamble replacement; and transmitting, over the PON, the second modified Ethernet packet.

Optionally, in any of the preceding embodiments, the transmitting of the initial envelope header over the PON uses a first wavelength; and the transmitting of the second initial envelope header over the PON uses a second wavelength.

Optionally, in any of the preceding embodiments, the transmitting of the initial envelope header and the first envelope header are part of transmitting an envelope; and the envelope comprises an Ethernet fragment.

According to one aspect of the present disclosure, there is provided a non-transitory computer-readable medium storing computer instructions, wherein the instructions, when executed by one or more processors, cause the one or more processors to perform steps of: generating an initial envelope header that indicates that the initial envelope header is not a preamble replacement; transmitting, over a passive optical network (PON), the initial envelope header; accessing an eight-byte block from a first Ethernet packet of a plurality of Ethernet packets; in response to eight-byte block being an Ethernet preamble, generating a first envelope header that indicates that the envelope header is a preamble replacement; and transmitting, over the PON, the first envelope header.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such a computer system into a specifically programmed machine.

In order to coordinate a bonded traffic transmission, the IEEE PON media access control (MAC) reconciliation sublayer (RS) is extended into a multi-point reconciliation sublayer (MPRS). A bonded transmission is one in which multiple wavelengths are used to simultaneously transmit related data frames from one end station to another (e.g., from an ONU to an optical line terminal (OLT) or vice versa). For example, a stream of Ethernet packets may be transmitted by sending each packet in a data frame. By transmitting a data frame on more than one channel simultaneously, the bandwidth of the connection is multiplied.

In existing systems, coordination of data sent on multiple channels is difficult, because the data frames sent on each channel do not include any coordination information. As discussed herein, user frames are encapsulated into "envelopes," with each envelope including a header and data. The data portion of an envelope may also be referred to as a payload. The envelope header may carry important information to delineate the envelope and envelope data, to control data reassembly, to optionally encrypt/decrypt the envelope data, or any suitable combination thereof. Thus, use of the described headers facilitates coordination of data sent on multiple channels. In the following discussion, envelopes applicable for IEEE 802.3ca 100GE-PON are cited as examples. In a more general sense, the invention is applicable to any type of multiple lane (or channel bonding) PON systems. Information in the envelope headers may be used by a receiving ONU to reassemble the multiple received data streams on the multiple wavelengths into a single data stream.

Figure 1:
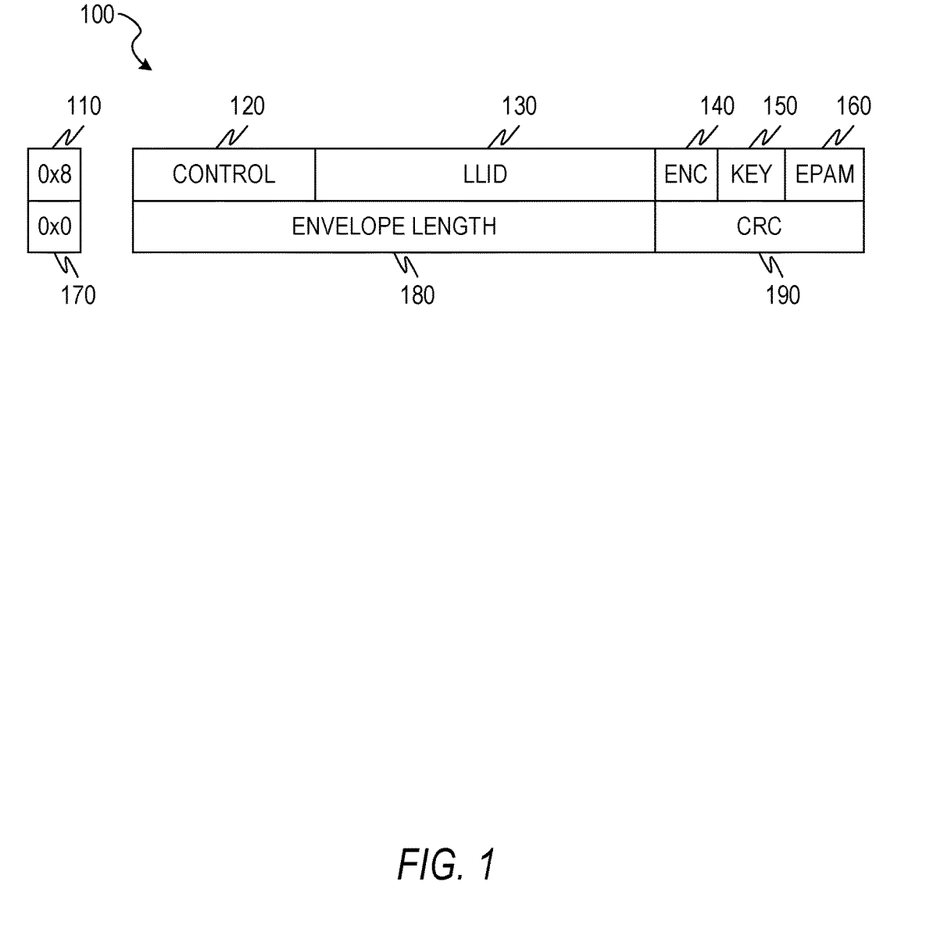
FIG. 1 is an illustration of an example envelope header structure, according to some example embodiments.

FIG. 1 is an illustration of an example envelope header structure 100, according to some example embodiments. The envelope header structure 100 comprises 64 bits and consists of a control byte 120, a logic link identifier (LLID) 130, an encryption flag 140, a key flag 150, an envelope position alignment marker (EPAM) 160, an envelope length 180, and a cyclic redundancy check (CRC) 190. In EPON, 32 bits of data (transmit data, also referred to as TXD) along with a 4-bit transmit control nibble (TXC) are transferred at a time using an xMII interface. There is one xMII interface for each wavelength. Each bit of a transmit control nibble indicates whether a corresponding byte of the TXD is a control byte. Accordingly, the 64-bit envelope header structure 100 is sent as two consecutive 32-bit TxD values, each TXD value having a corresponding TXC. Thus, the transmit control nibble 110 has a value of 0x8 (1000 in binary), indicating that the first byte of the envelope header structure 100 is a control byte (the control byte 120) and the transmit control nibble 170 has a value of 0x0 (0000 in binary), indicating that none of the last four bytes of the envelope header structure 100 are control bytes. Non-header data (e.g., Ethernet frames) does not include control bytes, so the value of the TXC for non-header data should be 0.

The control byte 120, 8 bits, is a control byte to delineate the beginning of an envelope. One or more bits of the control byte 120 may indicate that the envelope is a first envelope in a sequence or a continuation envelope in the sequence. In some example embodiments, the control byte 120 is a Start Control code with a value of 0xFB, also referred to as /S/ in the IEEE 802.3ca specification.

The LLID 130, 16 bits, is a logic link identifier to identify the traffic bearer and destination of the envelope data.

The encryption flag 140, 1 bit, indicates whether the payload is encrypted. If the encryption flag 140 is set to 1, the payload is encrypted; while data encryption is disabled if the flag is cleared. The key flag 150, 1 bit, indicates which data encryption key to use. Depending on the value of the key flag 150, either a first key or a second key is used. Accordingly, a computer, such as the computer 500 of FIG. 5, that receives the envelope header structure 100 may decrypt the payload in response to a determination that the encryption flag 140 is set to 1, using a key selected based on the value of the key flag 150. While one key is in use, the other key may be received in an envelope payload.

The EPAM 160, 6 bits, is an envelope position alignment marker. When multiple envelopes are sent simultaneously using different wavelengths, the value of the EPAM 160 is set by the transmitter to be the same for each of the multiple envelopes. The transmitter increments the value of the EPAM after each 64-bit transmission. Thus, the receiver can use the EPAM values of the received envelopes to correctly order the envelopes, even if the transmission delays for the different wavelengths are different. The receiver may add received data to a memory store that can store enough data to account for the maximum variable delay between the channels. The initial EPAM value serves as a row pointer into the memory store for data placement. The receiver pulls data from the memory store in row sequential order, thus the envelopes may be processed as though they had been received simultaneously.

The envelope length 180, 24 bits, is the length, in 64-bit blocks, of the envelope data including the envelope header. The envelope header itself is one 64-bit block. Thus, the minimum valid value for the envelope length 180 is 1, indicating that the envelope consists solely of the envelope header. An envelope having the maximum value of 0xFFFFFF (Ser. No. 16/777,215) 64-bit blocks would include 134,217,720 bytes of envelope data. A 64-bit block of an envelope is also referred to as an envelope quantum (EQ). In various example embodiments, more or fewer bits are used for the envelope length 180. For example, 22 bits may be used for the envelope length 180.

The CRC 190, 8 bits, is the CRC error-detecting code of the envelope header and covers all fields in the envelope header. For example, in FIG. 1, the CRC 190 covers the envelope header fields of the control byte 120, the LLID 130, the encryption flag 140, the key flag 150, the EPAM 160, and the envelope length 180. By comparing the value of the CRC 190 with an independently-computed CRC value from the covered fields, the receiver can detect errors that may have occurred during transmission.

Figure 2:
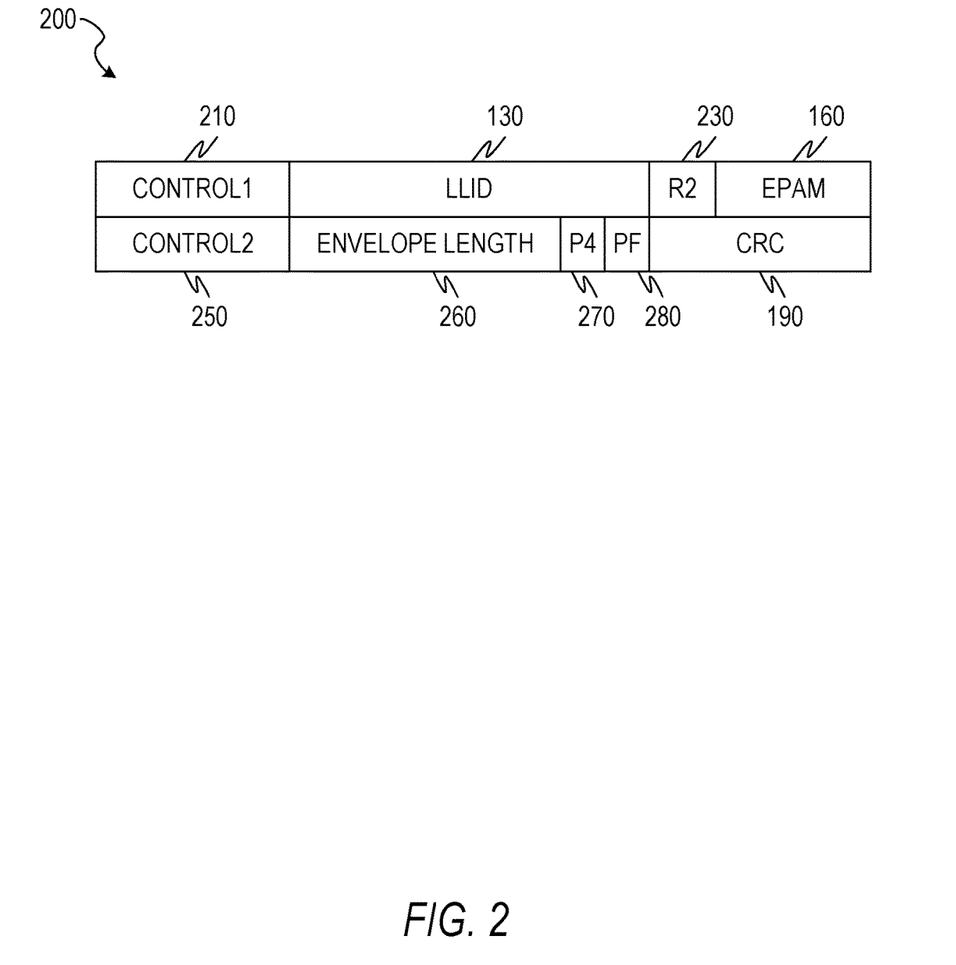
FIG. 2 is an illustration of an example envelope header structure, according to some example embodiments.

FIG. 2 is an illustration of an example envelope header structure 200, according to some example embodiments. The example envelope header structure 200 comprises 64 bits and consists of a first control byte 210, an LLID 130, reserved bits 230, an EPAM 160, a second control byte 250, an envelope length 260, padding 270, a preamble flag (PF) 280, and the CRC 190. The LLID 130 and the EPAM 160 are described above with respect to FIG. 1.

The first control byte 210 and the second control byte 250 are each 8 bits and together delineate the beginning of an envelope. In some example embodiments, the control bytes 210 and 250 indicate that the two 32-bit words of the envelope header structure comprise an ordered set. The reserved bits 230 are two bits. In some example embodiments, the first bit is an encryption flag that indicates data encryption status. The payload of the envelope is encrypted when the encryption flag is set and is not encrypted when the encryption flag is cleared. In these example embodiments, the second bit of the reserved bits 230 is a key flag that indicates the data encryption key to use when encryption is used. In other example embodiments, the reserved bits 230 may be combined with the EPAM 160 to duplicate the function of a data over cable service interface specification (DOCSIS) provisioning of EPON (DPoE) security byte.

The envelope length 260, 11 bits, is the length in 64-bit blocks of the envelope data following the envelope header.

Thus, an envelope using the envelope header structure 200 may have 0-16,380 bytes of envelope data. The padding 270 is four bits and has a default value of 0000.

The PF 280, 1 bit, indicates preamble replacement status; this envelope header is a preamble replacement when PF=1, this envelope header is not a preamble replacement when PF=0. In alternative embodiments, the PF 280 is replaced with a start flag that indicates that the envelope is a preamble replacement when the flag is 0 and that the envelope is not a preamble replacement when the flag is 1. The envelope may start with an envelope header that is not a preamble replacement and include multiple Ethernet frames within the envelope. Each Ethernet frame may include an envelope header that is a preamble replacement, replacing the preamble of the Ethernet frame. In case of a transmission error in which an envelope is only partially received, the last successfully-received Ethernet frame may be identified based on the preamble-replacing envelope header of that Ethernet frame (e.g., based on the envelope length value in the header).

The CRC 190, 8 bits, covers all fields of the envelope header structure 220: the first control byte 210, the LLID 130, reserved bits 230, the EPAM 160, the second control byte 250, the envelope length 260, the padding 270, and the PF 280.

Figure 3:
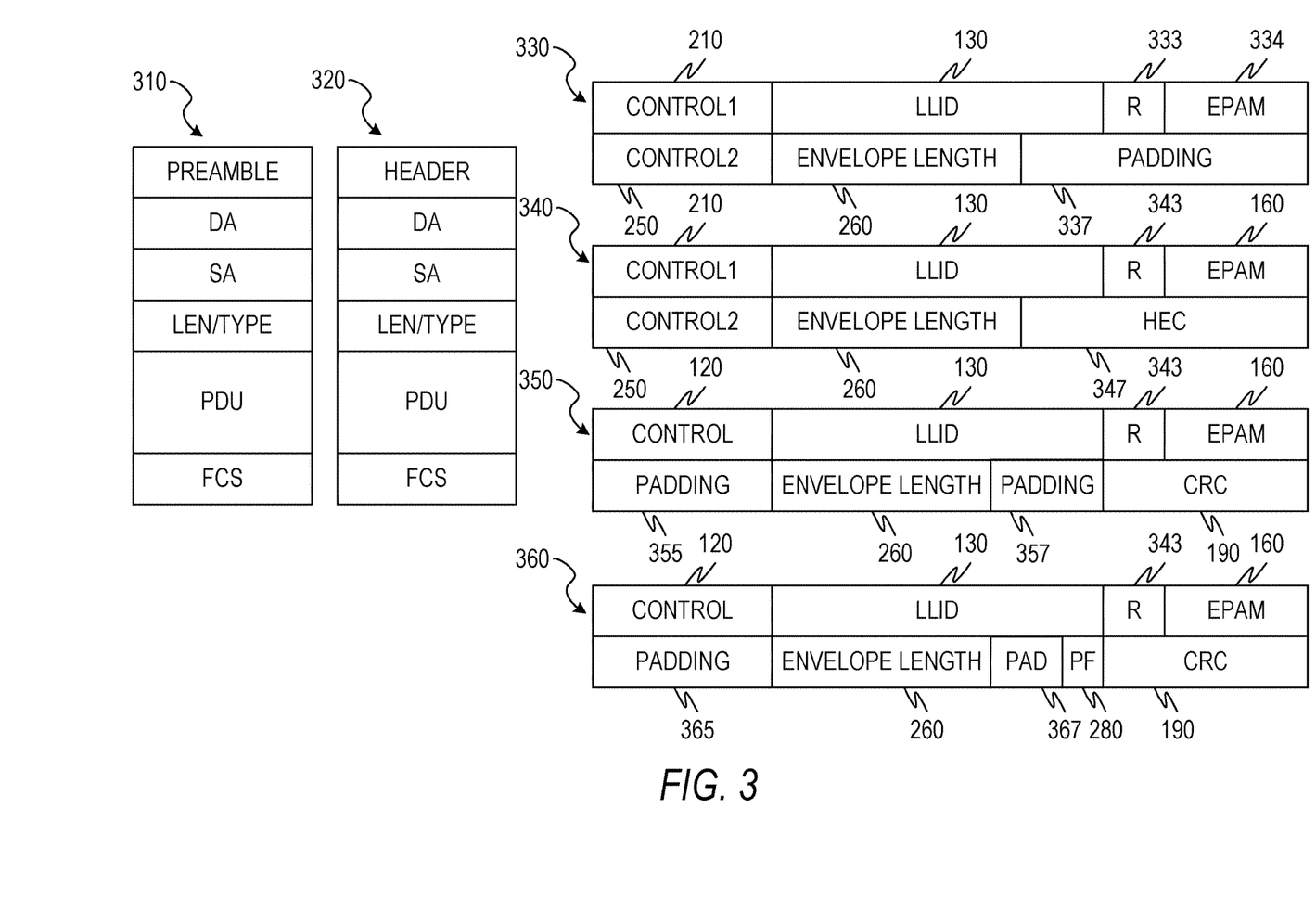
FIG. 3 is an illustration of example envelope header structures, according to some example embodiments.

FIG. 3 is an illustration of example envelope header structures 330, 340, 350, and 360, according to some example embodiments. The envelope header structures 330, 340, 350, 360 may be used in the modified Ethernet packet 320 in place of the preamble of a standard Ethernet packet 310. Envelope header designs other than the envelope header structures 100 and 200 are within the scope of the present disclosure. For example, FIG. 3 shows four additional options for the 64-bit envelope header structure.

The standard Ethernet packet 310 includes a 64-bit preamble, a destination address, a source address, a length/type field, a protocol data unit (PDU), and a frame check sequence (FCS). The preamble may be a fixed sequence of bytes represented by the sequence of hexadecimal values: 0x55 0x55 0x55 0x55 0x55 0x55 0x55 0xD5. The modified Ethernet packet 320 includes a 64-bit envelope header in place of the preamble of the standard Ethernet packet 310, and otherwise is the same as the standard Ethernet packet 310.

The envelope header structure 330 includes control bytes 210 and 250, the LLID 130, reserved bits 333, an EPAM 334, the envelope length 260, and padding 337. The LLID 130 is described above with respect to FIG. 1. The control bytes 210 and 250 and the envelope length 260 are described above with respect to FIG. 2. The reserved bits 333 are three bits that should be set to 0. The EPAM 334 is a five-bit envelope position alignment marker. The padding 337 is 13 bits that should be set to 0.

The envelope header structure 340 includes control bytes 210 and 250, the LLID 130, reserved bits 343, the EPAM 160, the envelope length 260, and hybrid error correction (HEC) 347. The LLID 130 and the EPAM 160 are described above with respect to FIG. 1. The control bytes 210 and 250 and the envelope length 260 are described above with respect to FIG. 2. The reserved bits 343 are two bits that should be set to 0, in some example embodiments. The HEC 347 is a thirteen-bit value that provides greater error-checking and recovery features than CRC 190. In some example embodiments the 6-bit EPAM 160 is combined with the two reserved hits 343 to duplicate the function of a DPoE security byte.

The envelope header structure 350 includes the control byte 120, the LLID 130, the reserved bits 343, the EPAM 160, padding 355 and 357, the envelope length 260, and the CRC 190. The control byte 120, the LLID 130, the EPAM 160, and the CRC 190 are described above with respect to FIG. 1. The envelope length 260 is described above with respect to FIG. 2. The padding 355 comprises eight hits that should be set to 0, in some example embodiments. The padding 357 comprises five bits that should be set to 0, in some example embodiments. In some example embodiments, the 6-bit EPAM 160 is combined with the two reserved bits 343 to duplicate the function of a DPoE security byte. In some example embodiments, a standard start control code in control byte 120 indicates preamble replacement. In other words, when a receiver recognizes the standard control byte 120 in the modified Ethernet packet 320, the receiver can recreate the standard Ethernet packet 310 by replacing the envelope header with an Ethernet preamble. Two different envelope header structures may be used by the transmitter and distinguished by the recipient based on the first control byte. For example, the envelope header structure 350 may be used when the envelope header replaces a preamble and the envelope header structure 330 may be used for a header that does not replace a preamble. Since the first control byte 210 of the envelope header structure 330 is in the same position as the control byte 120 of the envelope header structure 200, the receiver can check that byte to determine which envelope header structure is being processed and interpret the remaining fields of the envelope header accordingly.

The envelope header structure 360 includes the control byte 120, the LLID 130, the reserved bits 343, the EPAM 160, padding 365 and 367, the envelope length 260, the PF 280, and the CRC 190. The control byte 120, the LLID 130, the EPAM 160, and the CRC 190 are described above with respect to FIG. 1. The envelope length 260 and the PF 280 are described above with respect to FIG. 2. The padding 365 comprises eight bits that should be set to 0, in some example embodiments. The padding 367 comprises four bits that should be set to 0, in some example embodiments. In some example embodiments the 6-bit EPAM 160 is combined with the two reserved bits 343 to duplicate the function of a DPoE security byte. The control byte 120 may comprise a standard start control code that indicates preamble replacement.

Figure 4:
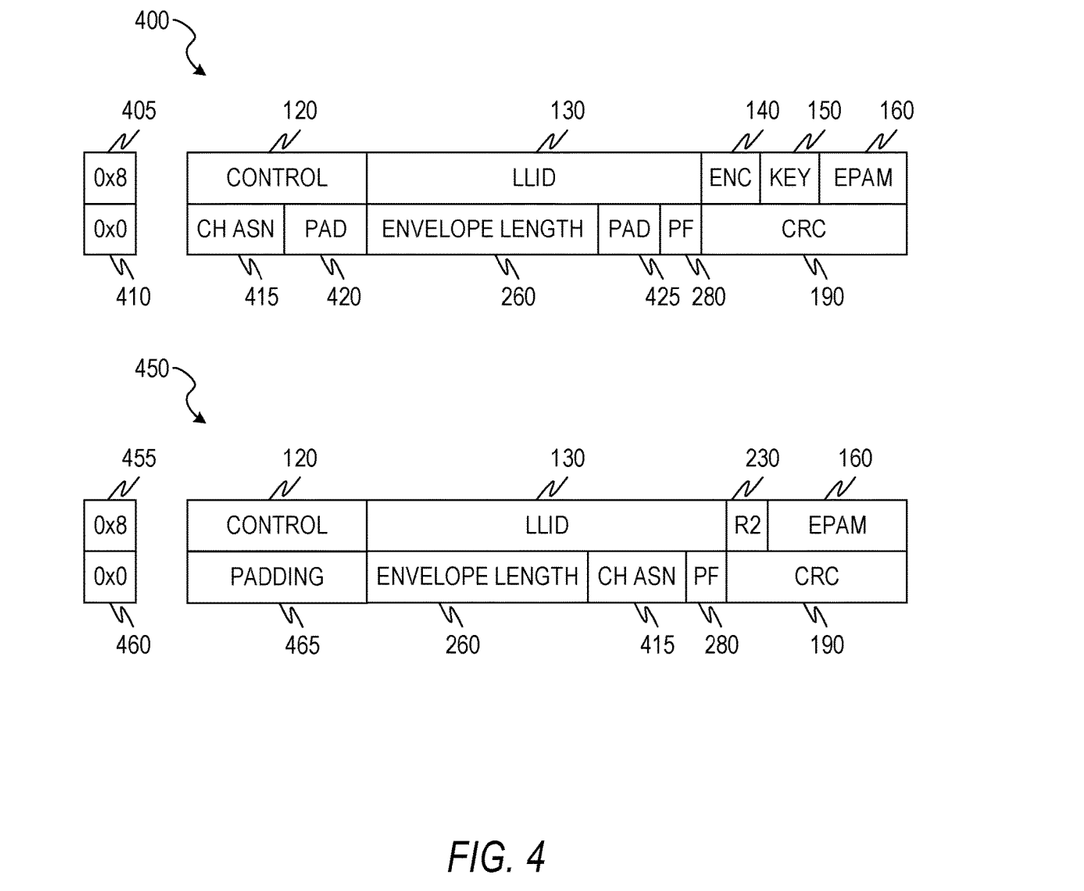
FIG. 4 is an illustration of example envelope header structures, according to some example embodiments.

FIG. 4 is an illustration of example envelope header structures 400 and 450, according to some example embodiments. The envelope header structure 400 includes the control byte 120, the LLID 130, the encryption flag 140, the key flag 150, the EPAM 160, a channel assignment field 415, padding 420 and 425, the envelope length 260, the PF 280, and the CRC 190. The envelope header structure 450 includes the control byte 120, the LLID 130, the reserved bits 230, the EPAM 160, padding 465, the envelope length 260, the channel assignment field 415, the PF 280, and the CRC 190. The control byte 120, the LLID 130, the encryption flag 140, the key flag 150, the EPAM 160, and the CRC 190 are described above with respect to FIG. 1. The envelope length 260 and the PF 280 are described above with respect to FIG. 2. The padding 420 and 425 are four bits each. The padding 465 is eight bits.

The control nibbles 405 and 410 indicate that the first byte of the envelope header structure 400 is a control byte and the remaining bytes of the envelope header structure 400 are not control bytes. The control nibbles 455 and 460 indicate that the first byte of the envelope header structure 450 is a control byte and the remaining bytes of the envelope header structure 450 are not control bytes In some example embodiments, channel information is carried in the envelope header. The channel information helps the receiver to confirm that received envelopes come from the correct channels. In a special case when one envelope applies to multiple channels, the channel information in the envelope header clarifies this multiple channel application. The channel information may be a bit-mapped 4-bit field, with each bit representing a different channel in the PON system.

The envelope header structures 400 and 450 are two examples of carrying such channel information in the envelope header. The channel assignment field 415, 4-bits, is a bitmap representing the wavelength channels this envelope applies to. Table 1, below, lists the channel assignment bitmap details, in some example embodiments.

TABLE 1

Channel Assignment field definition

| Bit | content |
| --- | --- |
| 0 (LSB) | 0—This envelope doesn't apply to Channel 0 |
| | 1—This envelope applies to Channel 0 |
| 1 | 0—This envelope doesn't apply to Channel 1 |
| | 1—This envelope applies to Channel 1 |
| 2 | 0—This envelope doesn't apply to Channel 2 |
| | 1—This envelope applies to Channel 2 |
| 3 (MSB) | 0—This envelope doesn't apply to Channel 3 |
| | 1—This envelope applies to Channel 3 |

The envelope header structures of FIGS. 1-4 may be implemented in a general-purpose computer modified (e.g., configured or programmed) by software to be a special-purpose computer to utilize the envelope header structures. For example, a computer system able to implement any one or more of the methodologies described herein is discussed below with respect to FIG. 5.

Figure 5:
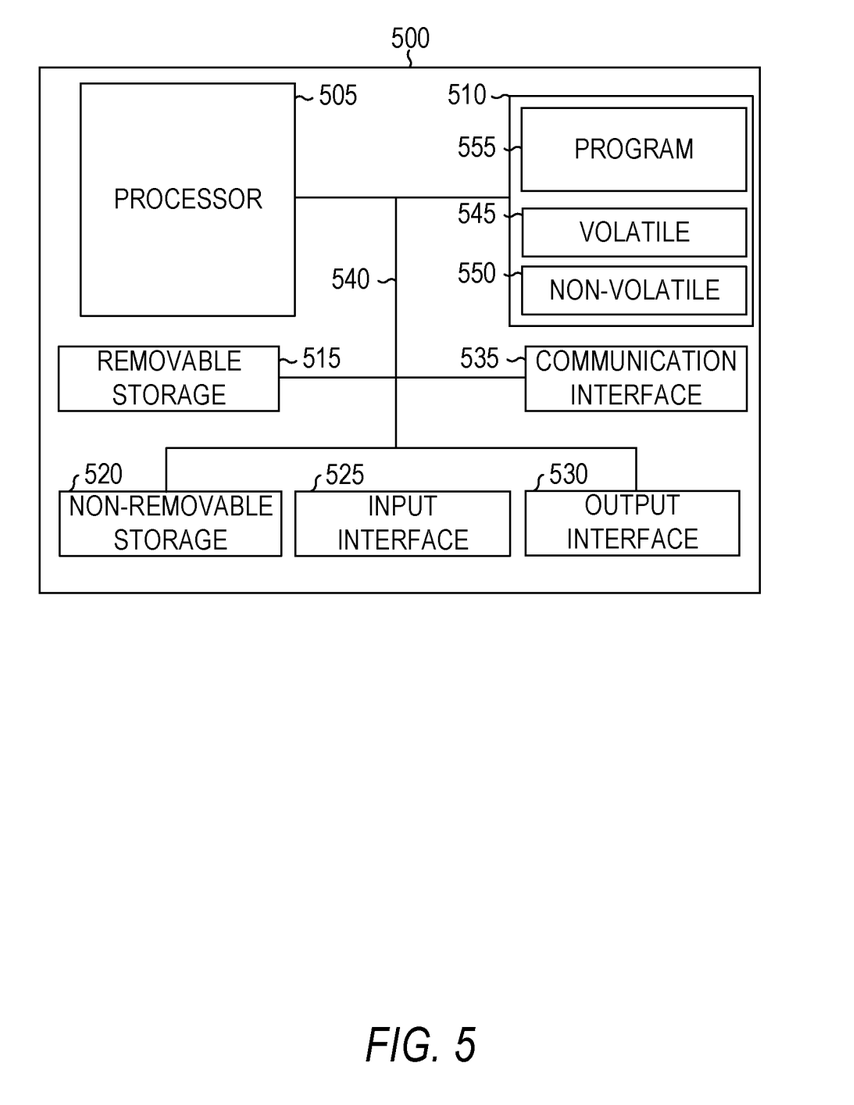
FIG. 5 is a block diagram illustrating circuitry for clients and servers that implement algorithms and perform methods, according to some example embodiments.

FIG. 5 is a block diagram illustrating circuitry for implementing algorithms and performing methods, according to example embodiments. All components need not be used in various embodiments. For example, an ONU and an OLT may each use a different set of components.

One example computing device in the form of a computer 500 (also referred to as computing device 500 and computer system 500) may include a processor 505, memory storage 510, removable storage 515, non-removable storage 520, input interface 525, output interface 530, and communication interface 535, all connected by a bus 540. Although the example computing device is illustrated and described as the computer 500, the computing device may be in different forms in different embodiments.

The memory storage 510 may include volatile memory 545 and/or non-volatile memory 550, and may store a program 555. The computer 500 may include—or have access to a computing environment that includes—a variety of computer-readable media, such as the volatile memory 545, the non-volatile memory 550, the removable storage 515, and/or the non-removable storage 520. Computer storage includes random-access memory (RAM), read-only memory (ROM), erasable programmable read-only memory (EPROM), electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 555 stored in the memory 510) are executable by the processor 505 of the computer 500. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 555 may utilize the envelope header structure using modules such as a communication module, a flow scheduling module, and a flow coordinating module. Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 6:
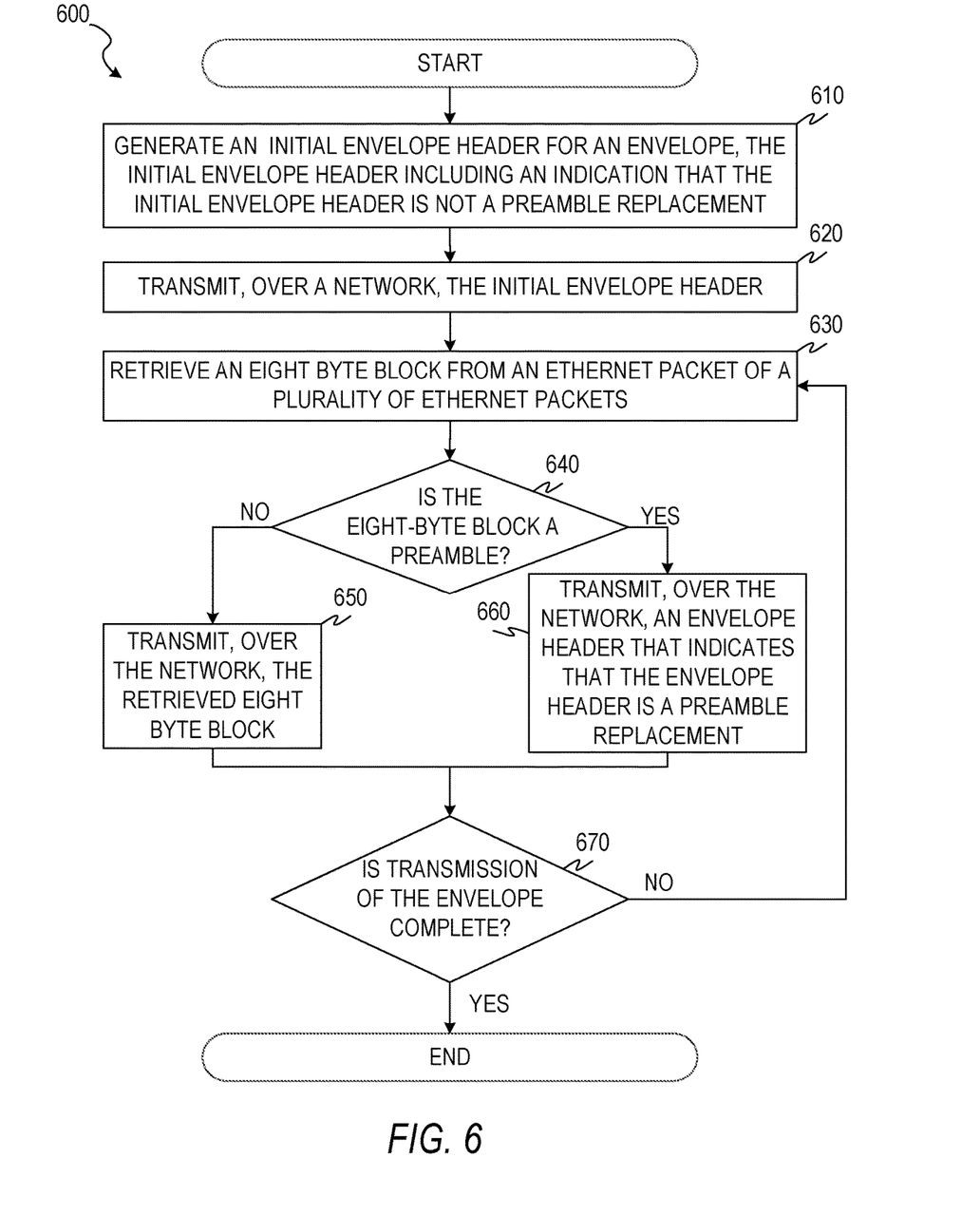
FIG. 6 is a flowchart illustrating a method of handling Ethernet packets, according to some example embodiments.

FIG. 6 is a flowchart illustrating a method 600 of handling Ethernet packets, according to some example embodiments. The method 600 includes operations 610, 620, 630, 640, 650, 660, and 670 and may be performed by a computer 500 transmitting data over a network. The computer 500 may be an ONU in an optical network that transmits data over the optical network.

In operation 610, the computer 500 generates an initial envelope header that indicates that the initial envelope header is not a preamble replacement. For example, the envelope header structure 200 may be used, with PF 280 set to zero. A data structure comprising a list of Ethernet packets may have been provided prior to execution of the method 600. The total size of the Ethernet packets, measured in EQs, may be determined and, if smaller than the envelope size limit, included in the envelope length 260. If the total size of the Ethernet packets is greater than the envelope size limit, the envelope is filled to capacity and the remaining Ethernet packets and packet fragment (e.g., the remaining portion of a partial Ethernet packet at the end of this envelope) may be sent in a subsequent envelope. In operation 620, the computer 500 transmits the initial envelope header over a network.

In operation 630, the computer 500 retrieves an eight byte block from an Ethernet packet of a plurality of Ethernet packets. For example, a pointer to the next EQ to be transmitted may be initialized to the beginning of the data structure comprising the list of Ethernet packets and incremented after each eight-byte block is retrieved. The data structure may include Ethernet fragments as well as complete Ethernet packets. For example, if the previous envelope ended with a first portion of an Ethernet packet, the current envelope may begin with an ending portion of the Ethernet packet. Similarly, if the total length of the Ethernet packets to be sent exceeds the envelope length, the current envelope may end with a beginning portion of an Ethernet packet.

In operation 640, the computer 500 determines if the eight-byte block is an Ethernet preamble. If the eight-byte block is an Ethernet preamble, the computer 500 transmits, over the network, an envelope header that indicates that the envelope header is a preamble replacement (operation 660). For example, the envelope header structure 200 may be used, with PF 280 set to one. If the eight-byte block is not an Ethernet preamble, the computer 500 transmits the retrieved eight-byte block over the network (operation 650).

In operation 670, the computer 500 determines if the transmission of the envelope is complete. For example, a number of EQs transmitted during the method 600 may be compared to the number of EQs of the data structure received prior to execution of the method 600. If the transmission is complete, the method 600 ends. Otherwise, the method 600 continues by returning to operation 630 and processing additional data.

Thus, as operation 630 iterates over all eight-byte blocks of an Ethernet packet, the entire Ethernet packet is transmitted over the network with the exception of the preamble, which is replaced by an envelope header. The result is a modified Ethernet packet having the structure of the modified Ethernet packet 320, described above with respect to FIG. 3.

Figure 7:
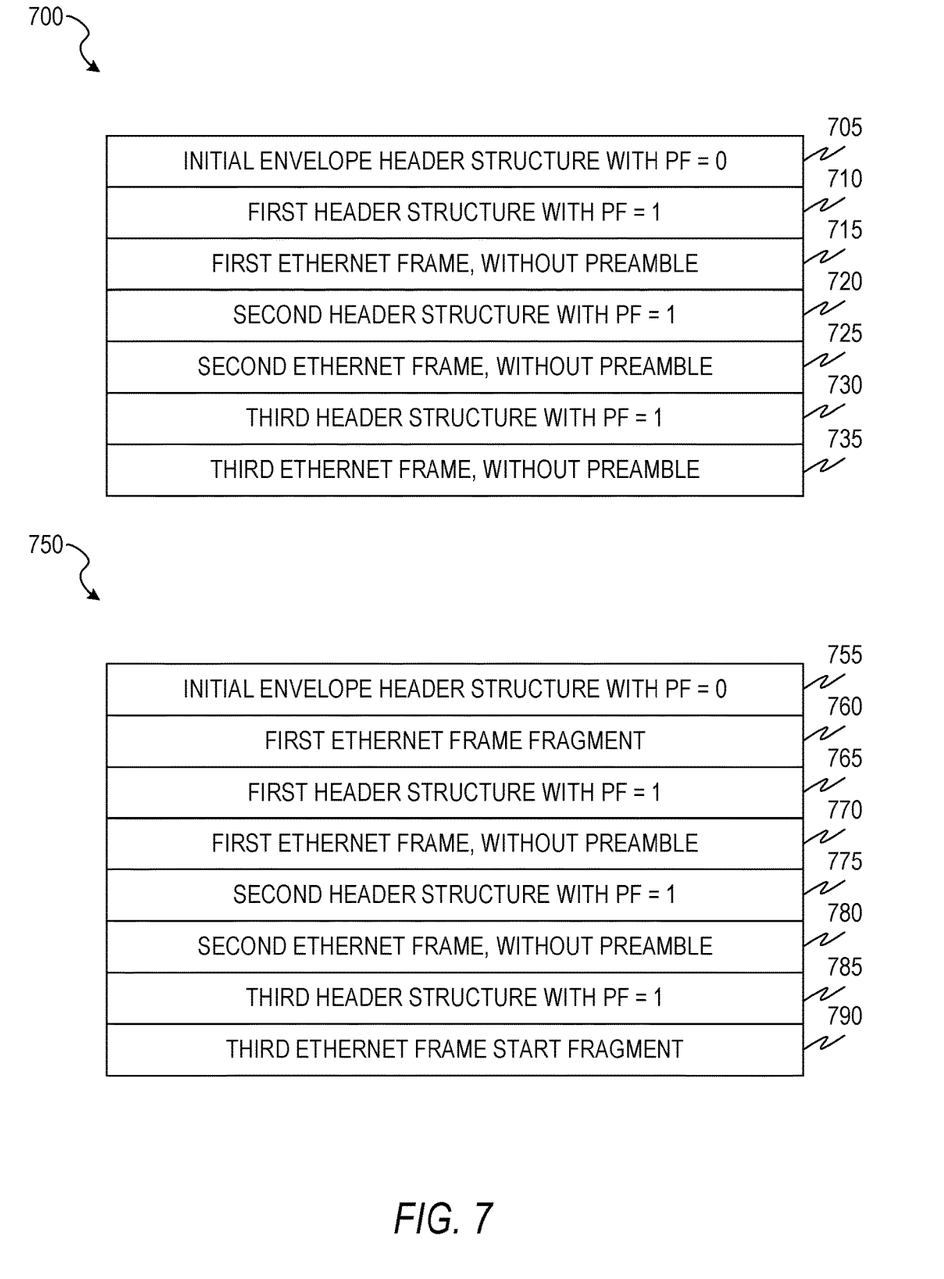
FIG. 7 is an illustration of an example envelope, according to some example embodiments.

FIG. 7 is an illustration of example envelopes 700 and 750, according to some example embodiments. The example envelope 700 includes an initial envelope header structure 705, envelope header structures 710, 720, and 730, and Ethernet frames 715, 725, and 735. The Ethernet frames 715, 725, and 735 do not include preambles. Thus, by comparison with the Ethernet packet 310, the Ethernet frames 715, 725, and 735 include the destination address, the source address, the length/type field, the PDU, and the FCS, but not the preamble. In the envelope 700, the preambles of the Ethernet frames 715, 725, and 735 have been replaced by the envelope header structures 710, 720, and 730. The replacement envelope header structures include a PF flag that is set to one (or a start flag set to zero) to indicate that the envelope header structures are in place of a preamble. The initial envelope header structure 705 includes a PF flag that is set to zero (or a start flag set to one) to indicate that the initial envelope header structure 705 is a header for the entire envelope 700, not just a single Ethernet frame 715, 725, or 735.

The example envelope 750 includes an initial envelope header structure 755, envelope header structures 765, 775, and 785, Ethernet frames 770 and 780, and Ethernet frame fragments 760 and 790. In the envelope 750, the preambles of the Ethernet frames 770 and 780 as well as the preamble of the Ethernet frame fragment 790 have been replaced by the envelope header structures 765, 775, and 785. The replacement envelope header structures include a PF flag that is set to one (or a start flag set to zero) to indicate that the envelope header structures are in place of a preamble. The initial envelope header structure 755 includes a PF flag that is set to zero (or a start flag set to one) to indicate that the initial envelope header structure 755 is a header for the entire envelope 750, not just a single Ethernet frame or frame fragment.

The Ethernet frame fragment 790 is a first portion of a third Ethernet frame. The example envelope 750 may contain a number of EQs insufficient to contain the entirety of the third Ethernet frame. Accordingly, the first portion of the third Ethernet frame is included in the example envelope 750 and the remainder (or at least a second portion) is included in the next envelope. The Ethernet frame fragment 760 is a last portion of the first Ethernet frame. The prior envelope may have included the first portion of the first Ethernet frame. Thus, the receiver can recover the first Ethernet frame by concatenating the Ethernet frame fragment 760 to the final Ethernet frame fragment of the preceding envelope.

Figure 8:
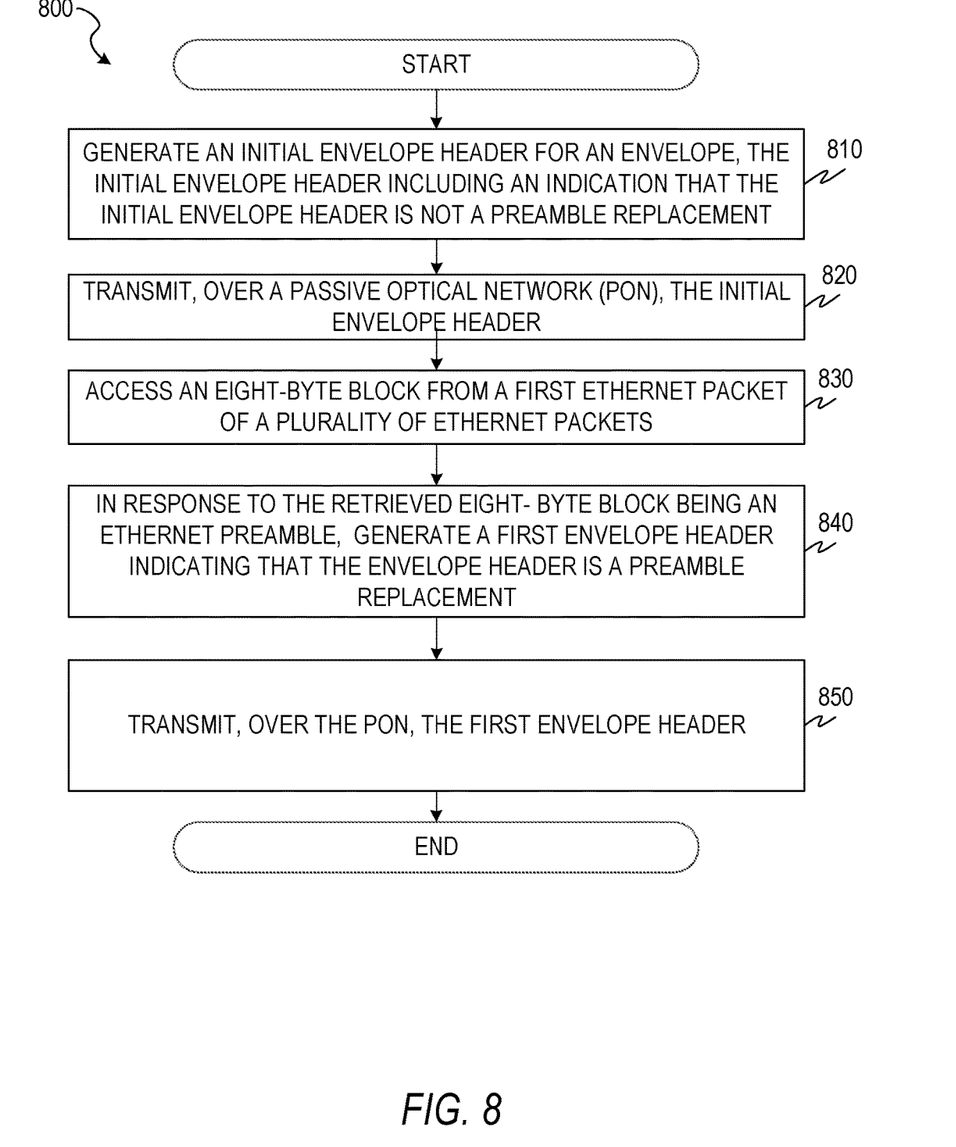
FIG. 8 is a flowchart illustrating a method of handling Ethernet packets, according to some example embodiments.

FIG. 8 is a flowchart illustrating a method 800 of handling Ethernet packets, according to some example embodiments. The method 800 includes operations 810, 820, 830, 840, and 850 and may be performed by a computer 500 transmitting data over a PON. The computer 500 may be an ONU in an optical network that transmits data over the optical network.

In operation 810, the computer 500 generates an initial envelope header that indicates that the initial envelope header is not a preamble replacement. For example, the envelope header structure 200 may be used, with PF 280 set to zero. A data structure comprising a list of Ethernet packets may have been provided prior to execution of the method 800. The total size of the Ethernet packets, measured in EQs, may be determined and, if smaller than the envelope size limit, included in the envelope length 260. If the total size of the Ethernet packets is greater than the envelope size limit, the envelope is filled to capacity and the remaining Ethernet packets and packet fragment (e.g., the remaining portion of a partial Ethernet packet at the end of this envelope) may be sent in a subsequent envelope. In operation 820, the computer 500 transmits the initial envelope header over a PON.

In operation 830, the computer 500 accesses an eight-byte block from a first Ethernet packet of a plurality of Ethernet packets. In operation 840, the computer 500 generates, in response to the eight-byte block being an Ethernet preamble, a first envelope header that indicates that the first envelope header is a preamble replacement. For example, the envelope header structure 200 may be used, with PF 280 set to one. In operation 850, the computer 500 transmits the first envelope header over the PON. Thus, in conjunction with the transmission of the remaining bytes of the first Ethernet packet, the receiver will receive the same amount of data as for a standard Ethernet packet, but will be better able to process that data by virtue of the additional information included in the first envelope header as compared to an Ethernet preamble.

Although a few embodiments have been described in detail above, other modifications are possible. Other components may be added to, or removed from, the described systems. Other embodiments may be within the scope of the following claims.

What is claimed is:

1. A computer-implemented method of handling Ethernet packets in a passive optical network (PON) comprising:
   generating, by the one or more processors, an initial envelope header that indicates that the initial envelope header is not a preamble replacement;
   transmitting, over the PON, by the one or more processors, the initial envelope header;
   accessing, by the one or more processors, an eight-byte block from a first Ethernet packet of a plurality of Ethernet packets;
   in response to the eight-byte block being an Ethernet preamble, generating, by the one or more processors, a first envelope header that indicates that the first envelope header is a preamble replacement;
transmitting, over the PON, by the one or more processors, the first envelope header;
generating a modified second Ethernet packet from a second Ethernet packet of the plurality of Ethernet packets by replacing a preamble of the second Ethernet packet with a second envelope header that includes an indication that the second envelope header is a preamble replacement; and
transmitting, over the PON, the modified second Ethernet packet;
wherein the transmitting of the initial envelope header, the first envelope header, and the modified second Ethernet packet are part of transmitting an envelope.

2. The method of claim 1, wherein the generating of the modified second Ethernet packet comprises:
setting, in the second envelope header, a flag that indicates that the modified second Ethernet packet is encrypted; and
encrypting the modified second Ethernet packet.

3. The method of claim 2, wherein:
the generating of the modified second Ethernet packet comprises setting, in the second envelope header, a flag that corresponds to an encryption method; and
the encrypting of the modified second Ethernet packet comprises encrypting the modified second Ethernet packet using the encryption method.

4. The method of claim 1, wherein:
the transmitting of the envelope comprises transmitting an Ethernet fragment after the modified second Ethernet packet.

5. The method of claim 1, wherein the initial envelope header further comprises:
a 1-bit encryption flag;
a 1-bit key flag;
an 8-bit cyclic redundancy check (CRC) field; and
a 6-bit envelope position alignment marker (EPAM) field.

6. The method of claim 5, wherein:
the EPAM field of the initial envelope header has a value; and
further comprising:
generating, by the one or more processors, a second initial envelope header that indicates that the second initial envelope header is not a preamble replacement, wherein the second initial envelope header comprises a 6-bit EPAM field containing a value that is the same as the value of the EPAM field of the initial envelope header; and
transmitting, over the PON, by the one or more processors, the second initial envelope header.

7. The method of claim 6, wherein:
the transmitting of the initial envelope header over the PON uses a first wavelength; and
the transmitting of the second initial envelope header over the PON uses a second wavelength.

8. The method of claim 1, wherein:
the transmitting of the envelope comprises transmitting an Ethernet fragment.

9. The method of claim 8, wherein:
the Ethernet fragment is after the initial envelope header and before the first envelope header.

10. A system for transmitting Ethernet packets over a passive optical network (PON) comprising:
a memory storage comprising instructions; and
one or more processors in communication with the memory storage,
wherein the one or more processors execute the instructions to perform:
generating an initial envelope header that indicates that the initial envelope header is not a preamble replacement;
transmitting, over the PON, the initial envelope header;
accessing an eight-byte block from a first Ethernet packet of a plurality of Ethernet packets;
in response to the eight-byte block being an Ethernet preamble, generating a first envelope header that indicates that the first envelope header is a preamble replacement;
transmitting, over the PON, the first envelope header;
generating a modified second Ethernet packet from a second Ethernet packet of the plurality of Ethernet packets by replacing a preamble of the second Ethernet packet with a second envelope header that includes an indication that the second envelope header is a preamble replacement; and
transmitting, over the PON, the modified second Ethernet packet;
wherein the transmitting of the initial envelope header, the first envelope header, and the modified second Ethernet packet are part of transmitting an envelope.

11. The system of claim 10, wherein the generating of the modified second Ethernet packet comprises:
setting, in the second envelope header, a flag that indicates that the modified second Ethernet packet is encrypted; and
encrypting the modified second Ethernet packet.

12. The system of claim 11, wherein
the generating of the modified second Ethernet packet comprises setting, in the second envelope header, a flag that corresponds to an encryption method; and
the encrypting of the modified second Ethernet packet comprises encrypting the modified second Ethernet packet using the encryption method.

13. The system of claim 10, wherein:
the transmitting of the envelope comprises transmitting an Ethernet fragment after the modified second Ethernet packet.

14. The system of claim 10, wherein the initial envelope header further comprises:
a 1-bit encryption flag;
a 1-bit key flag;
an 8-bit cyclic redundancy check (CRC) field; and
a 6-bit envelope position alignment marker (EPAM) field.

15. The system of claim 14, wherein:
the EPAM field of the initial envelope header has a value; and
the one or more processors further perform:
generating a second initial envelope header that indicates that the second initial envelope header is not a preamble replacement, wherein the second initial envelope header comprises a 6-bit EPAM field containing a value that is the same as the value of the EPAM field of the initial envelope header; and
transmitting, over the PON, the second initial envelope header.

16. The system of claim 15, wherein:
the transmitting of the initial envelope header over the PON uses a first wavelength; and
the transmitting of the second initial envelope header over the PON uses a second wavelength.

17. The system of claim 10, wherein:
the envelope comprises an Ethernet fragment.

18. A non-transitory computer-readable medium storing computer instructions, wherein the instructions, when executed by one or more processors, cause the one or more processors to perform steps of:

generating an initial envelope header that indicates that the initial envelope header is not a preamble replacement;

transmitting, over a passive optical network (PON), the initial envelope header;

accessing an eight-byte block from a first Ethernet packet of a plurality of Ethernet packets;

in response to the eight-byte block being an Ethernet preamble, generating a first envelope header that indicates that the first envelope header is a preamble replacement;

transmitting, over the PON, the first envelope header;

generating a modified second Ethernet packet from a second Ethernet packet of the plurality of Ethernet packets by replacing a preamble of the second Ethernet packet with a second envelope header that includes an indication that the second envelope header is a preamble replacement; and     transmitting, over the PON, the modified second Ethernet packet;

wherein the transmitting of the initial envelope header, the first envelope header, and the modified second Ethernet packet are part of transmitting an envelope.

19. The computer-readable medium of claim 18, wherein the generating of the modified second Ethernet packet comprises:

setting, in the second envelope header, a flag that indicates that the modified second Ethernet packet is encrypted; and     encrypting the modified second Ethernet packet.

20. The computer-readable medium of claim 19, wherein:

the generating of the modified second Ethernet packet comprises setting, in the second envelope header, a flag that corresponds to an encryption method; and     the encrypting of the modified second Ethernet packet comprises encrypting the modified second Ethernet packet using the encryption method.

\* \* \* \* \*